United States Patent [19]

Few et al.

[11] Patent Number: 4,947,640
[45] Date of Patent: Aug. 14, 1990

[54] GAS TURBINE ENGINE PHOTON IGNITION SYSTEM

[75] Inventors: Jimmy D. Few; James W. L. Lewis, both of Tullahoma, Tenn.

[73] Assignee: University of Tennessee Research Corporation, Knoxville, Tenn.

[21] Appl. No.: 317,101

[22] Filed: Feb. 28, 1989

Related U.S. Application Data

[63] Continuation of Ser. No. 043,177, Apr. 27, 1987, abandoned.

[51] Int. Cl.$^5$ .............................. F02G 1/005
[52] U.S. Cl. ................. 60/39.06; 60/39.821; 123/143 B; 431/258
[58] Field of Search ............. 60/39.828, 39.821, 39.06, 60/39.141; 123/143 B, 145 A, 145 R; 431/258, 2, 6, 1

[56] References Cited

U.S. PATENT DOCUMENTS

| 3,167,015 | 1/1965 | Smith et al. | 60/39.821 |
|---|---|---|---|
| 3,258,910 | 7/1966 | Seymour | 60/39.821 |
| 3,473,879 | 10/1969 | Berberich | 60/39.821 |
| 3,791,302 | 2/1974 | McLeod | 60/39.828 |
| 3,861,371 | 1/1975 | Gamell | 123/143 B |
| 4,035,131 | 7/1977 | Cerkanowicz | 60/39.06 |
| 4,302,933 | 12/1981 | Smith | 60/39.821 |
| 4,314,530 | 2/1982 | Giacchetti | 123/143 B |
| 4,416,226 | 11/1983 | Nishida et al. | 123/143 B |
| 4,434,753 | 3/1984 | Mukainakano et al. | 123/143 B |
| 4,556,020 | 12/1985 | Hickling | 123/143 B |
| 4,726,336 | 2/1988 | Hoppie et al. | 123/143 B |

FOREIGN PATENT DOCUMENTS 1236561 6/1971 United Kingdom .
1360196 7/1974 United Kingdom ............ 123/143 B

OTHER PUBLICATIONS

Brad E. Forch et al., Technical Report BRL-TR-27409, U.S. Army Ballistic Research Laboratory, "Photochemical Ignition Studies. II. Oxygen-Atom Two-Photon Resonance Effects", Jun. 1986.
Andrezik W. Miziolek et al., Technical Report BRL-TR-2644, U.S. Army Ballistic Research Laboratory, "Photochemical Ignition Studies. I. Laser Ignition of Flowing Premixed Gases", Feb. 1985.

Primary Examiner—Donald E. Stout
Attorney, Agent, or Firm—Perman & Green

[57] ABSTRACT

A photon ignition system for igniting the air/fuel spray within a combustion chamber of a gas turbine engine is comprised of a photon source 20, a photon transmission means 22 and a focussing means 24. The source 20 has an output wavelength characteristic suitable for being absorbed by the hydrocarbon fuel droplets within the fuel spray. In accordance with one embodiment of the invention the source 20 comprises an ultraviolet flashlamp having spectral characteristics which are selected to be strongly absorbed by hydrocarbon fuel. In another embodiment of the invention the source 20 comprises a laser, such an excimer laser, having an output pulse with wavelengths within the strong absorption range of hydrocarbon fuel. The photon output of the source 20 is focussed within an optimum region of the fuel spray for igniting one or more droplets therein due to the absorption and subsequent heating of the droplets of the focussed photon output.

37 Claims, 5 Drawing Sheets

FIG. 11

GAS TURBINE ENGINE PHOTON IGNITION SYSTEM

This is a continuation of co-pending application Ser. No. 043,177 filed on Apr. 27, 1987, and now abandoned.

FIELD OF THE INVENTION

The present invention relates to hydrocarbon fuel ignition systems and, in particular, to a photon ignition system for a gas turbine engine.

DESCRIPTION OF THE TECHNOLOGY

All known gas turbine engines, such as those used for aircraft, employ one or more spark ignitors to ignite the air/fuel mixture within the combustor portion of the engine. The combustor is typically comprised of a housing having an inner liner which encloses a can type or a substantially annular combustion chamber. The chamber typically has one or more fuel injectors, each of the injectors atomizing by means of pressurized fuel or air the fuel passing therethrough to provide a fuel spray. The ignitor is positioned at a peripheral portion of the combustion chamber, passing through the housing and inner liner. The operation of the ignitor results in a high energy spark which travels across a surface of the ignitor between two opposed electrodes. The energy of the spark ignites the spray at the peripheral portion of the chamber, the ignition thereafter propagating from the peripheral portion of the chamber to a central portion where the fuel spray exiting the fuel injectors is ignited. Although spark ignitors are typically well suited for their intended purpose, as evidenced by wide spread use, the technological evolution of the gas turbine engine has resulted in the need for a more efficient type of ignition system.

Several problems are associated with the use of a spark ignitor. One problem is related to the ignitor's position at a peripheral portion of the combustion chamber which is not an optimum position to ignite the air/fuel spray emanating from the fuel injectors. Thus, the spark of the ignitor may fail to ignite or to completely ignite the air/fuel spray within the combustor.

Secondly, due to the nature of the operation of the ignitor, the device is subject to degradation and erosion by the action of the spark traveling thereacross. This ignitor degradation results in a requirement that the the ignitor be replaced at regular intervals, thus the user of the ignitor incurs the cost associated with a replacement ignitor and the labor involved in its installation.

Thirdly, due to the requirement that the ignitor shank extend through the combustor inner liner and into the chamber, the ignitor shank obstructs the air flow through a combustor outer air passage, resulting in a disturbance of the airflow and the generation of turbulence in the outer air passage. The peripheral position of the ignitor at the liner wall is also not optimum in that air required for cooling of the liner forces the spray away from the ignitor. In order to achieve ignition under such a nonoptimum condition the power into the ignitor is typically increased resulting in a proportional decrease in ignitor life.

A still further disadvantage of a spark ignitor system is related to the electrical losses experienced in the ignition system between the source of ignitor power and the ignitor. The source of ignitor power is typically a capacitive device which charges to the breakdown voltage of the ignitor and subsequently discharges across the ignitor electrodes, resulting in the spark. This discharge energy is conveyed by electrical cables which have an inductive loss associated therewith. This inductive loss experienced by the discharge energy may typically be as great as 80 to 90 percent. The nature of such a capacitive power source further results in a relatively constant spark frequency of approximately three sparks per second. This frequency, under some engine operating conditions, may not be an optimum frequency.

SUMMARY OF THE INVENTION

The foregoing problems of the prior art are overcome and other advantages are realized by a gas turbine engine which, in accordance with the method and apparatus of the invention, comprises a photon ignition system for igniting the air/fuel mixture within the combustion chamber.

In an illustrative embodiment of the invention a source of radiant energy, or photons, is provided for igniting the air/fuel mixture. The source of radiant energy may be a laser having a pulsed radiant output having a wavelength which lies within the ultraviolet (UV) portion of the electromagnetic spectrum, the UV being that portion of the spectrum which is most completely absorbed by the hydrocarbon molecules which comprise JP-5 fuel. The radiant output is coupled to the combustion chamber by a photon transmission means such as an optical fiber. The source of radiant energy may also be a flashlamp having output wavelengths in the UV. The radiation is transmitted by the optical fiber to a focussing means which focusses the beam at a selected region within the air/fuel mixture, the mixture being provided, typically, as a spray. The region of the fuel spray is selected to be at an optimum position within the spray in order to provide the best ignition characteristics. The photon ignition system comprises the photon source, the transmission means and the focussing means which are amenable to packaging in a small, lightweight module which is capable of being mounted on an aircraft jet engine.

The use of the invention advantageously provides for positioning the focal point of the radiation at a region in space which is determined to be an optimum region for the ignition of the fuel spray and, thus, requires a minimum amount of ignition system energy. This overcomes the problem of the prior art wherein the spark ignitor is positioned at the combustor liner wall where the fuel spray is generally not desired, the cooling of the liner forcing the fuel spray away from the ignitor. The problem of the higher ignitor energy required to achieve reliable ignition under this circumstance, which in turn shortens the useful life of the ignitor, is also thus overcome. The ignition system of the present invention provides for projecting, if desired, the radiation through an existing combustor lining primary air hole such that no special ignitor hole, which requires special liner cooling treatment, is necessary. In addition, the shank of the ignitor which tends to obstruct the air flow through the combustor outer air passage is eliminated, thereby providing for an unobstructed outer air passage and the elimination of disruptive turbulence therein.

The photon ignition system of the present invention also overcomes the problem related to the relatively large inductive losses experienced by the electrical ignition power between the source of ignitor power, typically a capacitive network, and the ignitor. In the photon ignition system of the present invention the losses are greatly reduced inasmuch as there are minimal inductive loss effects involved; the losses are instead relatively small optical losses experienced by the radiation as it traverses the optical fiber.

Furthermore, the relatively fixed ignition firing rate of approximately three sparks per second due to the characteristics of the capacitive network is overcome in that the photon ignition system may have a photon source operated at a variable pulse rate. Due to the elimination of the spark ignitor the photon ignition system of the present invention has no devices which are rapidly consumed or degraded during operation, thereby resulting in a reduced maintenance schedule and the costs associated therewith. The overall reliability of the ignition system and, hence, the engine, is therefore also greatly improved.

BRIEF DESCRIPTION OF THE DRAWINGS

These and other aspects of the present invention will be more fully set forth and described in the following description of illustrative embodiments thereof taken in conjunction with the drawing, wherein.

DETAILED DESCRIPTION OF THE INVENTION

Figure 1:
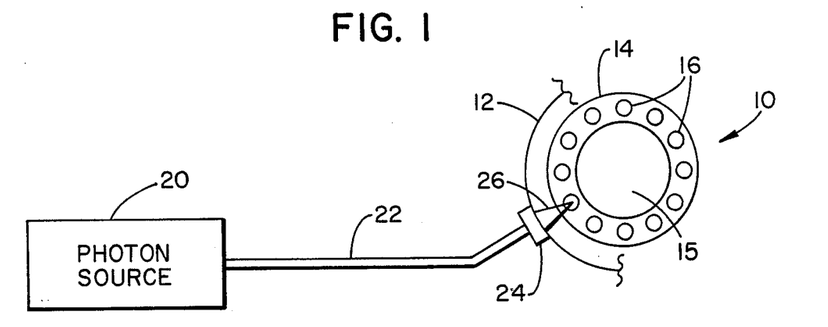
FIG. 1 is a schematic and partly sectional view showing a photon source coupled to a combustion chamber by a transmission and focussing means.

Referring to FIG. 1 there i shown a portion of a gas turbine engine 10 having a combustor housing 12, a combustor liner 14 and a plurality of fuel injectors 16 adjacent to a combustion chamber 15. Each of the fuel injectors 16 is operable for producing a fuel spray 18 which comprises an air/fuel mixture. The fuel for the gas turbine engine 10 is, typically, a hydrocarbon fuel such as JP-5. Such a hydrocarbon fuel is comprised of a plurality of various types of hydrocarbon molecules which in general are characterized by high energy carbon-oxygen bonds which, when broken during ignition, provide the engine 10 with the desired power. The power of the gas turbine engine may be utilized in a number of different ways depending upon the application for the engine. For example, the engine may be employed within a helicopter for turning the rotor, within an armored vehicle for providing motive power, or within a jet aircraft for providing thrust thereto. Thus, it should be realized that the illustrative embodiments of the invention which will be described below have great utility in a variety of different applications.

It should further be realized that the invention may be advantageously employed for igniting a number of different types of hydrocarbon fuels, such as JP-4 and diesel fuel, in a variety of different types of combustion chambers. For example, the photon ignition system of the invention may be utilized for igniting the fuel in an oil burner or a piston engine.

In accordance with an illustrative embodiment of the invention, the ignition of the fuel spray 18 is accomplished by a photon source 20 having a radiant energy output which is coupled to the combustion chamber 15 of the engine 10 by a photon transmission means, such as an optical fiber 22. The radiant energy output of source 20 is coupled into the chamber 15 by a coupling means, such as a focussing means 24, to produce a focussed beam 26 of radiant energy, the beam 26 being focussed at an optimal region of the fuel spray 18 to achieve ignition. The focussed beam 26 induces the ignition of one or more fuel droplets within the optimal region of the fuel spray 18, the ignition subsequently propagating throughout the combustion chamber 15 to ignite the fuel spray from each of the plurality of fuel injector 16. Once ignited, the combustion of the fuel is, ideally, a continuous, self-sustaining process.

Preferably, the photon source 20 is comprised of a pulsed source such as a flashlamp or a laser. In accordance with the invention, the radiant output of photon source 20 comprises a predetermined wavelength or range of wavelengths. The wavelength or range of wavelengths is predetermined to coincide with the range of wavelengths which are most thoroughly absorbed by the hydrocarbon fuel. Thus, the absorption of the radiant energy output of photon source 20 by fuel droplets within the spray 18 induces a localized heating within one or more of the droplets, thereby resulting in the ignition of the droplet or droplets. This feature of the invention will be described in detail hereinafter.

Figure 2:
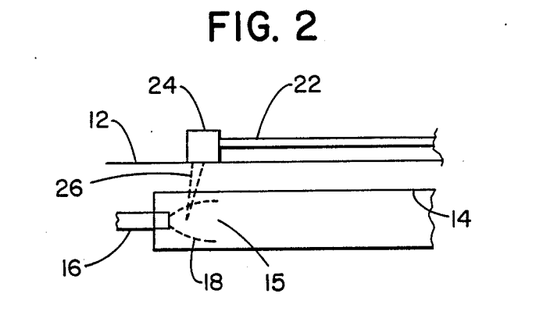
FIG. 2 is a schematic and partly sectional view of a portion of FIG. 1 showing a focussed beam of photons and its position relative to a hydrocarbon fuel spray.

As shown in FIGS. 1 and 2, the focussed beam is directed into the combustor through an opening provided in the combustor housing 12. A primary airhole provided within liner 14 may be advantageously utilized for this purpose. Alternatively, the use of the invention may also be practiced by providing an opening made specifically for admitting the focussed beam 26 into the combustor.

Figure 3:
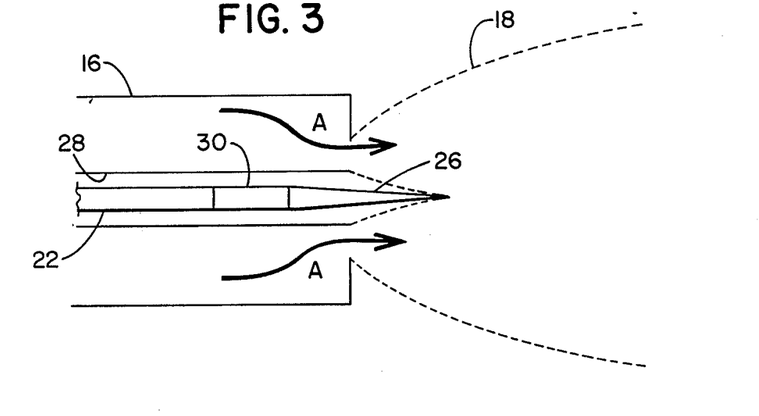
FIG. 3 is a schematic and cross-sectional view showing a focussed beam of photons being provided from within a fuel injector.

In FIG. 3 there is shown an alternate embodiment of the invention, wherein the transmission means 22 and focussing means 24 is provided within one of the fuel injectors 16. In such a fuel injector 16 the liquid fuel is provided under pressure, as is depicted by the arrows labeled A, around a centrally disposed air conduit 28, the conduit conveying pressurized air to openings made within the end of the injector 16 whereby the air and the liquid fuel are mixed to form the fuel spray 18. In accordance with this embodiment of the invention, the transmission means 22, which may be an optical fiber, is provided with a terminal portion 30 having a radially varying index of refraction which results in the focussing of the radiant energy into the focussed beam 26.

Figure 4:
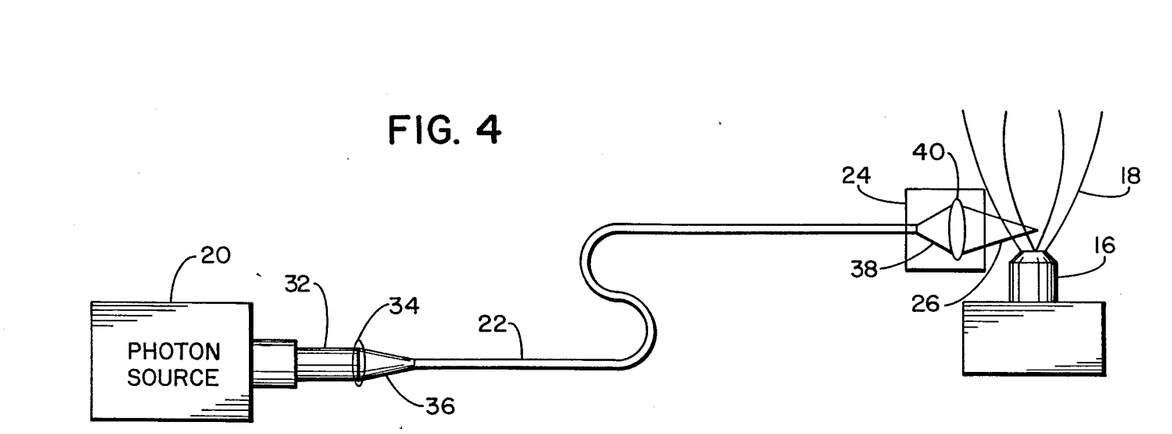
FIG. 4 is a schematic view of one embodiment of the present invention having a lens disposed to focus the beam of photons at the fuel spray.
Figure 5:
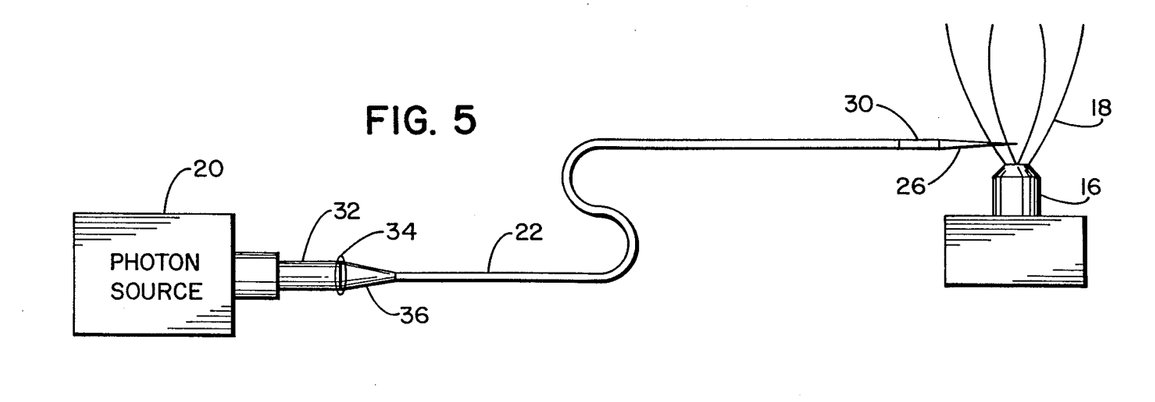
FIG. 5 is a schematic view of another embodiment of the present invention wherein the focussing of the photon beam is achieved by a graded index optical fiber.

Such a fiber is known as a "graded index" fiber. Thus, the use of a separate or external focussing lens is not required. The end of the optical fiber 22 is positioned such that the focus of the beam 26 is provided at an optimum point within the spray 18 to cause the ignition of the spray 18, the optimum point being determined to be a point where a minimal amount of input energy to the photon source 20 is operable to ignite the fuel spray. Of course, the exact position of the optimum point is related to, for example, the size and geometry of the combustor and may best be determined in an empirical manner. Referring to FIGS. 4 and 5 there is shown in greater detail the aforedescribed features of the present invention. As can be seen in FIG. 4 photon source 20 has a radiant energy output 32 which impinges on a collecting lens 34 whereby the output 32 is formed into a partially focussed beam 36 which then impinges on an end of fiber 22. The degree of focus of beam 36 is selected to avoid damage to the end of fiber 22. The radiant energy output 32 thereafter traverses the length of fiber 22 to an opposite, terminal end thereof. The focussing means 24, which may be enclosed within the terminal end, can be seen to be comprised of a focussing lens 40 which is operable for focussing the radiant energy output 38, as it exits fiber 22, into the focussed beam 26. The focal point of beam 26 is advantageously placed within a spatial region of the spray 18 such that the aforementioned localized heating of one or more fuel droplets occurs, resulting in the ignition of the droplets.

In FIG. 5 it can be seen that the focussing means 24 comprises the graded index type of optical fiber 22. The terminal region 30 of this type of fiber 22 has, as has been previously mentioned, a radially varying index of refraction which causes the focussing of the radiant energy within this portion, resulting in the focussed beam 26. One suitable type of graded index optical fiber is a type known as SEL-FOC.

The lenses shown in FIGS. 4 and 5 are illustrative only, it being realized that more than two such lenses may be utilized for a particular application. Furthermore, it can be realized that the focussing means 24 may be other than a lens or the graded index type of optical fiber. Any focussing means which is operable for focussing the radiant energy output may be employed in the use of the present invention.

Figure 6:
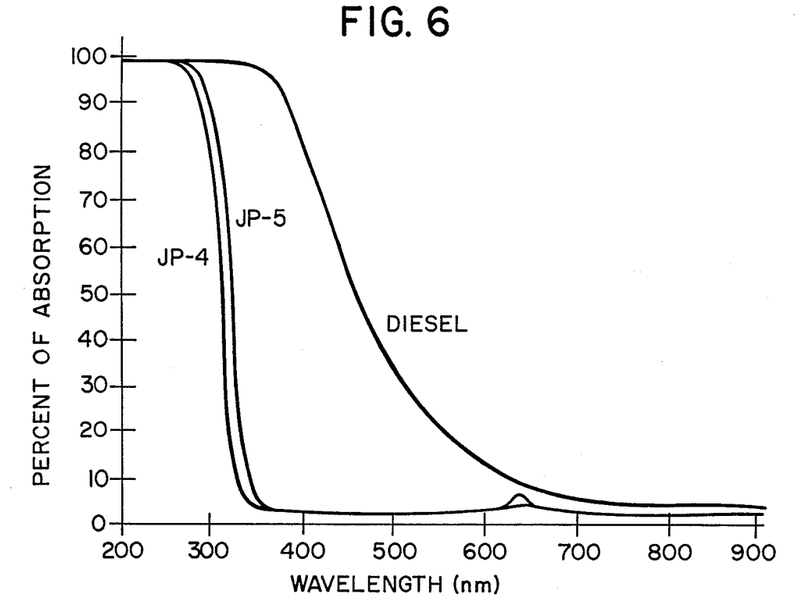
FIG. 6 is a graph showing the percent of radiation absorbance of several hydrocarbon fuels as a function of wavelength in nanometers.

As has been previously mentioned, the wavelength or range of wavelengths of the radiant energy output of photon source 20 is related to the radiation absorption characteristics of the hydrocarbon fuel which is desired to be ignited. FIG. 6 is a graph which shows the percent of absorbance of radiant energy by several hydrocarbon fuels, specifically JP-4, JP-5 and No. 2 fuel oil (diesel fuel). Of course, the absorption of the fuel is an inverse function of the transmittance, that is, 100 percent of transmittance corresponds to zero percent of absorption. Similarly, a zero percent of transmittance corresponds to 100 percent of absorption. As can be seen, the percent of absorbance of JP-5 remains at substantially one or two percent for the range of wavelengths of approximately 400 nanometers (nm) up to much longer wavelengths except for a small rise in the region of approximately 620 nm. In the graph of FIG. 6, the wavelength has been shown up to 900 nanometers.

Below 400 nm it has been found that the percent of absorbance abruptly rises, such that at 335 nm the percent of absorbance is approximately 80 percent. At approximately 330 nm and below the percent of absorbance is at a maximum, the percent of absorption being substantially 100 percent. This range of wavelengths of high absorption lies within that portion of the electromagnetic spectrum designated as the ultraviolet. More specifically, this region of high absorbance lies within that portion of the ultraviolet spectrum which extends from the transmission cut off wavelength of air, approximately 185 nm, and through approximately 400 nm. Below approximately 185 nm lies the region characterized as the vacuum ultraviolet, and, hence, is not of particular interest to an engine such as a gas turbine engine which relies upon an air environment for operation. Of course, the particular wavelength or wavelengths of interest are dependent on the range of wavelengths which are determined to be strongly absorbed by the fuel which is desired to be used in a combustion chamber. Therefore, it should be realized that the method and apparatus of the invention may be practiced with radiation having wavelengths other than those wavelengths which are by definition within the ultraviolet rejoin of the spectrum.

As is well known, the absorption of electromagnetic energy by a substance induces a localized heating within the substance due to the energy so absorbed. As an example, it is known that common window glass exhibits a high transmittance to electromagnetic radiation in the infrared portion of the spectrum. Thus a source of electromagnetic radiation having wavelengths in the infrared portion, such as the sun, which irradiates a sheet of window glass will cause a negligible heating of the glass due to the infrared radiation which passes substantially unhindered through the sheet of glass. Glass, however, is an efficient absorber of ultraviolet radiation and will experience a warming due to the ultraviolet component of the sunlight being absorbed therein.

In accordance with the foregoing example, it can be realized that if the radiant energy output of photon source 20 has a range of wavelengths which correspond to those wavelengths which are strongly absorbed by, for example, JP-5, a droplet of JP-5 will experience a localized heating when exposed to the radiant energy output. If the photon source is of sufficient energy, this localized heating will occur to such an extent that the fragmentation, electrical breakdown and ignition of the droplet of JP-5 will result. The aforementioned focussing of the radiant energy is but one method to achieve sufficient energy of the output at the desired wavelengths.

Figure 7:
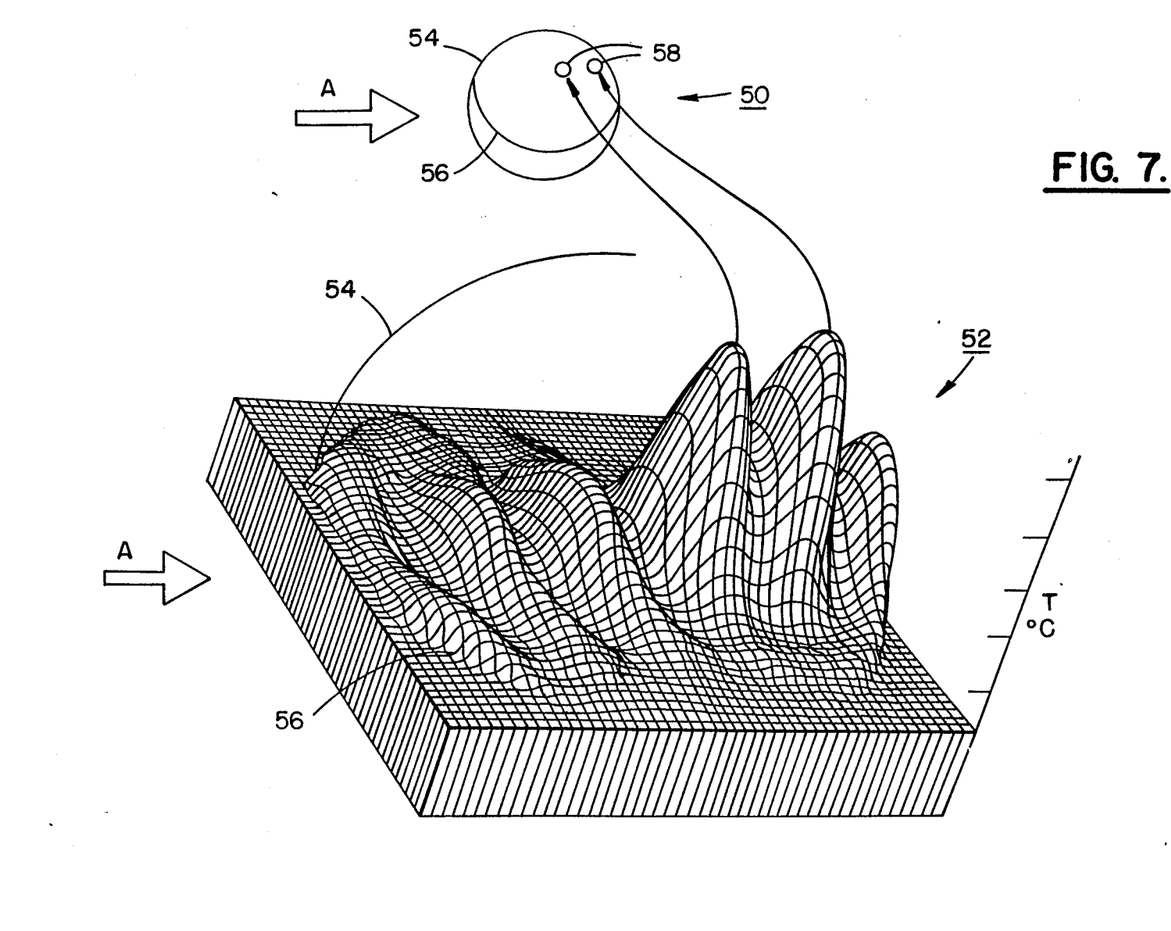
FIG. 7 is a graph showing the thermal gradient induced within a hydrocarbon fuel droplet due to an incident electromagnetic energy pulse.

Referring now to FIG. 7 there is shown a representative fuel droplet 50 which is typical of the droplets which are present in the fuel spray 18. Droplet 50 has an essentially spherical shape and may have a diameter at the time of ignition of from, typically, 20 micrometers to 1000 or more micrometers; the actual value depending on a variety of factors such as fuel temperature and injector design. The mean diameter of the droplets present in the fuel spray 18 is largely a function of the fuel injector 16. The graph 52 shows in three dimensions the internal temperature variation of the droplet 50 due to the absorption by the droplet of radiation within the range of wavelengths of between approximately 185 to 400 nm, the radiation impinging on the droplet from the direction indicated by the arrow labeled A. The graph 52 illustrates the internal temperature of the upper hemisphere 54 of the droplet 50, that is, that region of the droplet above an equitorial plane 56 which passes through the droplet 50. Of course, the entire droplet is so heated.

As can be seen, the internal temperature of the droplet varies in a nonlinear manner with spatially varying amplitudes. The particular nature of this temperature profile, or thermal gradient, is dependent upon several factors, such as the polarization of the impinging radiation, the wavelength and intensity of the radiation, the diameter of the droplet and the complex index of refraction of the hydrocarbon fuel within the droplet 50. For droplets having a size typically found in the air/fuel spray of a gas turbine engine and exposed to ultraviolet radiation in the range of wavelengths of approximately 185 to 400 nm it has been found that the internal temperature within localized regions of the droplet greatly exceeds the vapor temperature of the hydrocarbon fuel. For example, it is known that at atmospheric pressure the approximate vapor temperature of JP-4 is 220° F., JP-5 is 430° F. and No. 2 fuel oil is 470° F. These localized high temperature regions, two of which are shown in FIG. 7 as the regions 58, result in the formation of regions of superheated hydrocarbon fuel vapor within the liquid fuel droplet. The expansion of these regions of superheated vapor generates forces on the surface of the droplet which exceed the surface tension of the droplet, resulting in the rupture of the droplet 50. This rupture of the droplet 50 further results in the release of the superheated vapor and also submicron size droplets, or subdroplets of fuel into the region surrounding the droplet 50. This localized heating, rupture and release from the droplet 50 has been found to occur in a short duration of time, typically in less than 10 nanoseconds.

After the fragmentation of the droplet, as described above, the energy of the impinging radiation further causes a molecular breakdown of the fuel/air mixture resulting in the creation of free electrons. Also, the intensity of the radiant energy is sufficient to generate atomic oxygen from the oxygen present in the fuel/air mixture. The presence of these various components in a defined region of space, those components being the free electrons, the elemental oxygen and the fuel vapor and subdroplets results in the ignition of the fuel within this region.

As has been stated, the wavelength of the impinging radiation is one important factor in achieving such ignition. Furthermore, the intensity of this incident radiation within a given region of space is also an important factor. Inasmuch as both the radiation wavelength and intensity are in large part determined by the photon source 20, the transmission means 22 and the focussing means 24, these components of the present invention will now be more fully described.

Figure 8:
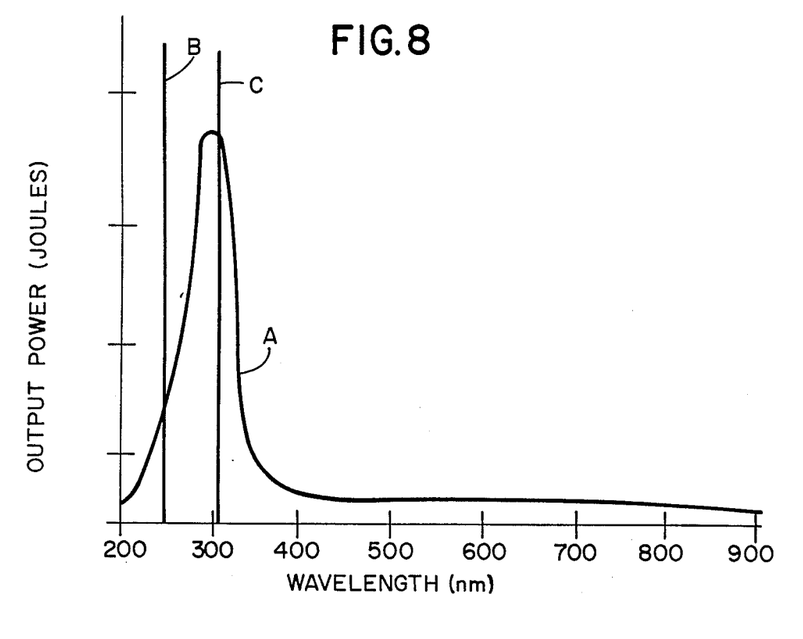
FIG. 8 is a graph showing the energy output of a flashlamp and a laser photon source as a function of wavelength in nanometers.
Figure 9:
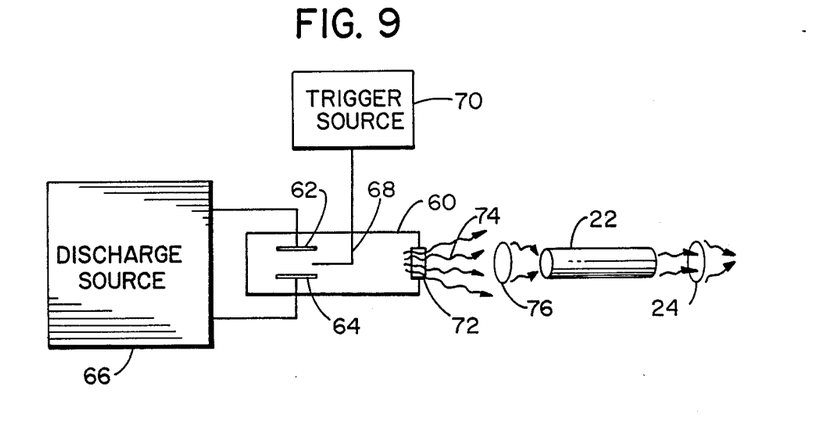
FIG. 9 is a schematic view of a photon ignition system having a flashlamp photon source.

Referring to FIG. 8 in conjunction with FIG. 9 there is shown one embodiment of the present invention wherein photon source 20 comprises a flashlamp 60 having a photon output in the ultraviolet portion of the electromagnetic spectrum. As can be seen in FIG. 8, flashlamp 60 has an output, the curve labeled A, having a range of wavelengths between approximately 200 to 380 nanometers. If the graphs of FIGS. 6 and 8 are superimposed one upon another it can readily be seen that this range of wavelengths lies within that range of wavelengths which are most strongly absorbed by JP-5.

Flashlamp 60 comprises an anode 62 and a cathode 64 coupled to a source of discharge voltage 66. Flashlamp 60 may also comprise a trigger electrode 68 coupled to a trigger source 70, the trigger source 70 being operable for providing in an adjustable fashion high voltage pulses on the trigger electrode 68 for initiating pulses of electromagnetic radiation 74 from the lamp 60. A pulse of electromagnetic radiation exits the flashlamp 60 through a suitable window 72, the pulse 74 being collected by a condensing lens 76 and being transmitted by a transmission means such as an optical fiber 22 to a focussing means 24. The focussed output of flashlamp 60 is thereby provided within the combustion chamber 15 to initiate the ignition of the air/fuel spray therein.

Condensing lens 76 may comprise one or more lenses, depending upon the desired characteristics of the pulse 74. For example, condensing lenses having a relatively small f-number will generally collect more radiation and thus deliver more power to the output beam. A multi-element condensing lens 76 will generally provide less spherical aberration and thus more of the beam energy is focussed into the end of fiber 22. The flashlamp 60 may also be provided with a reflector (not shown) suitably positioned to reflect a greater amount of the output radiation into the condensing lens 76.

As is known, a flashlamp such as the flashlamp 60 typically contains a gaseous medium such as mercury-xenon which is suitable for the production of ultraviolet radiation. Deuterium is another gaseous medium which provides an output in the desired ultraviolet range. The particular medium chosen for flashlamp 60 can be optimized to provide a high intensity electromagnetic output within the desired range of wavelengths.

Figure 10:
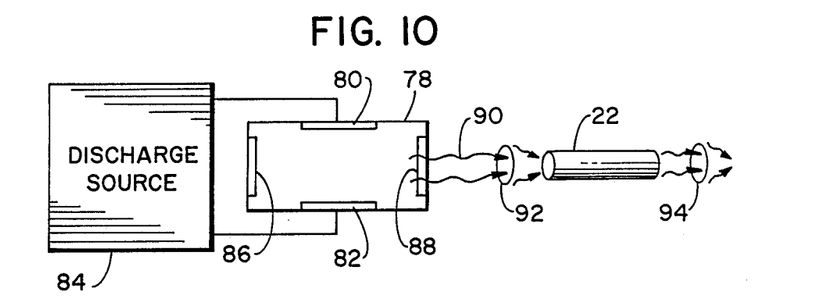
FIG. 10 is a schematic view of a photon ignition system having a laser photon source.

Referring now to FIG. 10 there is shown another embodiment of the present invention. In FIG. 10 a laser 78 can be seen to have a cavity defined by the region between a pair of electrodes 80 and 82 which are coupled to a discharge source 84. Discharge source 84 is operable to energize the electrodes 80 and 82 in order to excite a lasant medium (not shown) provided within the laser 78. The laser 78 also comprises a reflecting mirror 86 provided at one end of the laser cavity and, also, a partially reflecting/partially transmissive output mirror 88 provided at the opposite end of the cavity.

Due to the action of discharge source 84 in conjunction with electrodes 80 and 82, the lasant gas medium within laser 78 is caused to lase, thereby producing an intense pulse of output radiation 90 which is subsequently conveyed by a first condensing lens to a transmission means such as an optical fiber 22. The pulse 90 may be focussed upon exiting the fiber 22 by either a focussing lens 94 or by the optical characteristics of the fiber 22 itself, if the fiber is of the aforementioned graded index type. In general, the operation of such a laser provides for control over the pulse repetition rate such that the number of pulses generated per second may be varied in a controlled manner. As in the flashlamp 60, this control over the pulse repetition rate may be achieved by the engine user, such as a pilot, by providing suitable, well known controls coupled to the flashlamp or laser. Thus the fixed firing rate of the spark ignitor ignition system is overcome.

The laser 78 may be an excimer laser having a lasant gas medium comprised of krypton-fluoride which has a characteristic wavelength of approximately 250 nm. Referring to FIG. 8 it can be seen that this characteristic wavelength is shown as the spectral line B. The lasant medium within laser 78 may also be xenon-chloride which produces a characteristic wavelength of 308 nm. This wavelength is shown in FIG. 8 as the spectral line C.

In general, the flashlamp 60 will produce a relatively wide range of wavelengths whereas the laser 78 will produce a much narrower range of wavelengths or even a specific wavelength. Of course, the particular medium chosen for either the flashlamp 60 or the laser 78 is determined by the desired wavelength or wavelengths of output radiation, and thus may comprise a number of known gaseous and nongaseous mediums. Those examples of gaseous mediums given above are illustrative only and are in no way meant to limit the scope of the invention to those specific mediums nor to the wavelengths associated with those mediums. In a similar fashion it should be realized that the photon source 20 may be any source of electromagnetic energy having a continuous or a pulsed output comprised of wavelengths which are determined to be strongly absorbed by the particular fuel which is desired to be ignited.

As has been previously mentioned the intensity, or power, of the beam in Watts/cm$^2$ at the desired spatial region within the fuel spray is also an important consideration in achieving ignition of the fuel. In the case of the flashlamp embodiment of the invention shown in FIG. 9 it has been determined that a 10 W average pulse power is sufficient to induce ignition of the air/fuel spray. Thus, it can be realized that if the flashlamp 60 were operated at, for example, 10 pulses per second each such pulse has a characteristic energy of approximately one joules. The pulse width of the flashlamp may be equal to or less than 0.1 microseconds. Of course, the shorter the pulse width of the flashlamp 60 the greater will be the instantaneous power contained within the pulse. For the embodiment of FIG. 10, it has been found that a xenon-chloride laser having a pulse power of 0.1 joules and a pulse width of approximately 10 nanoseconds is sufficient to induce the ignition of the air/fuel spray. In general, the requisite power is related to the degree of focussing of the beam within the spray, the molecular composition of the spray, the diameter of the droplets contained therein, and a number of other factors.

Thus, the spectral and power characteristics of the particular source chosen for the photon source can be determined by the requirements of a particular application. In general, it has been found that approximately $10^8$ to $10^9$ W/cm$^2$ is sufficient to ignite a mixture of fuel vapor and submicron size droplets, it being remembered that this mixture is what is released by the droplet during the fragmentation of the droplet. This power compares favorably to a power level of approximately $10^{11}$ W/cm$^2$ which has been found to be required to induce the electric breakdown of pure fuel vapor containing no droplets.

As can be appreciated from the foregoing, the use of the invention provides a number of benefits and overcomes many of those problems related to the spark ignitor technology of the prior art. For example, in a gas turbine engine employing a spark ignitor typically two such ignitors are provided, one being held in reserve for use when the first ignitor has exceeded its useful life. The use of a flashlamp however, provides for a greatly reduced maintenance schedule. For example, if the flashlamp were operated at 10 flashes per second, which is approximately three times that of a spark ignitor source, the minimum lifetime of the flashlamp of $10^8$ pulses provides for approximately 2000 hours of operational life. The useful life of a laser source may also be typically measured in the millions of pulses, thereby providing similar performance. Of course, two separate photon ignition systems may be provided for each engine to achieve a redundancy related to engine reliability.

The aforementioned increase in useable life leads to even greater benefits in a gas turbine engine inasmuch as the ignition system may be left on permanently during the operation of the engine, thereby greatly improving the reliability of the engine. Typically, the spark ignitor is put in operation during the takeoff and landing of an aircraft in order to quickly reignite the air/fuel spray in the event of an inadvertent loss of combustion within the combustion chamber. The spark ignitor system may be turned off during flight other than take off and landing. If there is a loss of combustion during flight, the spark ignitor system must be once more energized in order to reignite the air/fuel mixture. The use of the present invention, however, permits the constant use of the ignition system during al 1 phases of f light, without consequently incurring an increased maintenance schedule due to ignitor replacement. Thus, the overall reliability of the engine is improved. Of course, in other systems which employ gas turbine engines as a source of power this feature of the invention may also be utilized to substantially prevent a loss of power due to an inadvertent loss of flame in the combustor.

Figure 11:
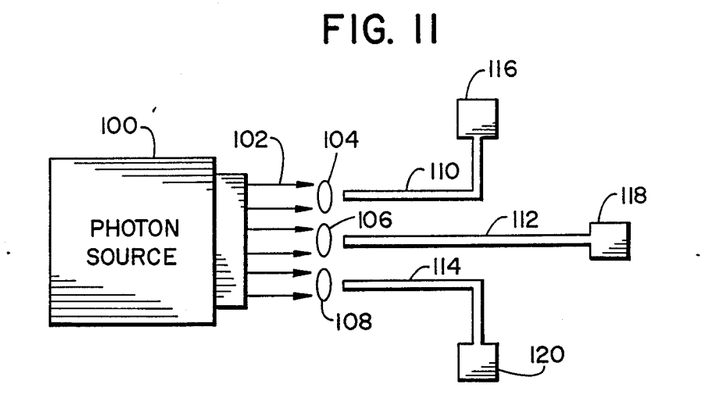
FIG. 11 is a block diagram showing a photon ignition system comprised of a single source and a plurality of photon transmission means for providing ignition energy to a plurality of engines.

The use of the present invention is also advantageous in that the photon ignition system may be designed such that one photon source is operable to cause ignition in a plurality of engines. As can be seen in FIG. 11, a photon source 100 having a photon output 102 is provided with a plurality of condensing lenses 104-108 which in turn couple the photon output into a plurality of optical fibers 110-114, respectively. Each of the fibers 110-114 transmits a portion of the photon output 102 to a corresponding gas turbine engine 116-120, respectively. Thus, a great savings in cost, complexity and weight may be achieved while yet providing for reliable ignition within the engines.

It should be realized that the use of the invention need not be restricted to a fixed wavelength or a range of wavelengths, it being within the scope of the invention to provide for a controllably variable wavelength output from the source of photons. For example, suitable wavelength absorption measurement means may be coupled to a source of fuel for an engine, the measurement means measuring in a real time, continuous manner the wavelength absorption characteristics of the fuel as the fuel is fed to the engine. Based upon the measured absorption characteristics the wavelength output of the source can be dynamically varied, such as by a controllable defraction grating means, to optimize the wavelength output to the absorption characteristics of the fuel. It should also be realized that the use of the invention does not require the addition to the fuel of additives specifically included to enhance the absorption characteristics of the fuel. Similarly, the use of the invention does not require the presence of absorptive material which may be present in the fuel due to the operation of the engine such as, for example, soot particles. Also, since the photon output is within the range of wavelengths which are strongly absorbed by the fuel it is not necessary to provide multiple pulses of energy in order to achieve an ignition.

Based upon the foregoing description of the invention it can be seen that illustrative embodiments of the present invention have been disclosed, these illustrative embodiments in no way being meant or intended to limit the scope of the invention to these embodiments. Instead, the scope of the invention is intended to be limited only as defined by the appended claims.

What is claimed is:

1. A method of igniting a hydrocarbon fuel comprised of droplets of hydrocarbon fuel, comprising the steps of:
   providing the hydrocarbon fuel as an air/fuel spray comprised of droplets of hydrocarbon fuel;
   generating electromagnetic energy having one or more wavelengths primarily within a range of approximately 185 nm to approximately 400 nm; and
   directing the energy into the air/fuel spray such that one or more droplets absorb the energy and are heated, fragmented and ignited thereby.

2. A method as defined in claim 1 wherein the step of providing includes a step of generating a spray of hydrocarbon fuel with one or more fuel injectors.

3. A method as defined in claim 1 wherein the step of generating electromagnetic energy includes a step of pulsing an electromagnetic energy source.

4. A method as defined in claim 1 wherein the step of directing further includes the steps of:
   directing the energy into a transmission means operable for transmitting the energy to the fuel; and
   focussing the energy such that the energy is focussed within a desired region within the fuel.

5. A method as defined in claim 4 wherein the desired region is a region wherein ignition of the fuel occurs with a minimum required amount of power of generated electromagnetic energy relative to other regions within the fuel.

6. A method of igniting a hydrocarbon fuel/air spray within a combustion chamber of a gas turbine engine, comprising the steps of:
   activating a source of electromagnetic energy to produce a radiant energy output, the radiant energy output having a wavelength or wavelengths primarily within a range of approximately 185 nm to approximately 400 nm; and
   directing the output into a hydrocarbon fuel/air spray within the combustion chamber, the hydrocarbon fuel being comprised of hydrocarbon fuel droplets, such that one or more of the droplets absorb the radiant energy, the droplet or droplets absorbing the output energy being heated, fragmented and ignited.

7. A method as defined in claim 6 wherein the step of directing further comprises the steps of:
   transmitting the radiant energy from the source to the combustion chamber; and
   focussing the radiant energy at a predetermined spatial position within the spray.

8. A method as defined in claim 7 wherein the step of focussing includes a step of providing a focussing means disposed adjacent the combustion chamber.

9. A method as defined in claim 7 wherein the predetermined spatial position is a position for igniting the spray with a minimum required radiant energy output of the source relative to other positions within the spray.

10. A method as set forth in claim 6 wherein the step of activating activates a laser to produce laser radiation.

11. A method as defined in claim 10 wherein the step of directing is accomplished by transmitting a pulse of laser radiation through an optical transmission means.

12. A method as defined in claim 6 wherein the step of activating activates a flashlamp to produce a pulse of radiant energy.

13. A method as defined in claim 12 wherein the step of activating a flashlamp is accomplished by activating an ultraviolet enhanced flashlamp having a characteristic range of wavelengths within the range of approximately 180 nm to approximately 400 nm.

14. A photon ignition system for igniting a fuel spray comprised of droplets of hydrocarbon fuel within a combustion chamber of a gas turbine engine comprising:
   means for generating a source of photons having a wavelength or wavelengths primarily within a predetermined range of wavelengths of approximately 185 nm to approximately 400 nm;
   means for transmitting the photons from said generating means to a combustion chamber within a gas turbine engine; and
   means for directing the photons to a predetermined region within a fuel spray within the combustion chamber, the spray comprising droplets of hydrocarbon fuel, the hydrocarbon fuel droplets within the predetermined region absorbing the photons and being heated, fragmented and ignited thereby.

15. A system as defined in claim 14 wherein said means for transmitting comprises an optical fiber.

16. A system as defined in claim 15 wherein said means for directing comprises an optical focussing means disposed between an output end of said fiber and the spray for focussing the photons within the predetermined region of the spray.

17. A system as defined in claim 15 wherein said means for directing is a terminal portion of said fiber, said terminal portion of said fiber having a radially varying index of refraction being operable for optically focussing the photons within a desired region of the spray.

18. A system as defined in claim 14 wherein said means for generating comprises a flashlamp operable for generating a pulsed photon output having wavelengths within said predetermined range of wavelengths.

19. A system as defined in claim 14 wherein said means for generating is a laser operable for generating a photon output having a wavelength or wavelengths within said predetermined range of wavelengths.

20. A gas turbine engine photon ignition system for igniting an air/fuel spray comprised of hydrocarbon fuel droplets within a combustion chamber of a gas turbine engine, comprising:
   a source of photons, said photons having a characteristic wavelength or wavelengths primarily within a range of approximately 185 nm to approximately 400 nm, the absorption of the photons by the hydrocarbon fuel droplets inducing a heating, fragmentation and ignition of the fuel droplets;
   photon transmission means being operable for transmitting the photons from the source to the combustion chamber; and
   focussing means operable for focussing the transmitted photons within the combustion chamber for igniting the fuel droplets within the air/fuel spray.

21. A system as defined in claim 20 wherein said focussing means focusses the photons through an opening made through a housing which encloses the combustion chamber.

22. A system as defined in claim 20 wherein said focussing means is provided within a fuel injector of the combustion chamber, said focussing means being operable for focussing the photons at a region defined by the air/fuel spray emanating from said fuel injector.

23. A system as defined in claim 20 wherein said source of photons comprises a flashlamp system.

24. A system as defined in claim 20 wherein said source of photons comprises a laser system.

25. A system as defined in claim 20 wherein the combustion chamber is provided with a plurality of photon ignition systems.

26. A method of igniting a fuel spray within a combustion chamber of a gas turbine engine, the fuel spray being comprised of droplets of hydrocarbon fuel, comprising the steps of:
    generating a pulse of electromagnetic energy having wavelengths primarily within a range of wavelengths between approximately 185 nm to approximately 400 nm;
    directing the pulse such that it contacts one or more of the droplets within the fuel spray; and
    absorbing within at least one droplet the energy of the pulse for inducing a thermal gradient within the droplet such that one or more internal regions of the droplet have a temperature which exceeds the vapor temperature of the hydrocarbon fuel, the temperature being of sufficient magnitude to rupture the surface of the droplet such that hydrocarbon fuel vapor is released and the droplet is fragmented into smaller droplets and free electrons resulting in an ignition of the droplet.

27. A method as defined in claim 26 wherein the step of generating is accomplished by activating a flashlamp.

28. A method as defined in claim 26 wherein the step of generating is accomplished by activating a laser.

29. In a system having one or more gas turbine engines for providing power thereto, each of the engines comprising a combustion chamber wherein an air/fuel spray is ignited, the fuel comprising a hydrocarbon fuel, a method of igniting the air/fuel spray within each of the combustion chambers comprising the steps of:
    activating at least one source of electromagnetic energy to produce a radiant energy output, the radiant energy output comprising a wavelength or wavelengths primarily within a range of approximately 185 nm to 400 nm; and
    directing the output into the air/fuel spray within each of the combustion chambers, the spray being comprised of hydrocarbon fuel droplets, such that one or more of the droplets absorb the radiant energy and are heated, fragmented and ignited thereby.

30. A method as defined in claim 29 wherein the system is an aircraft and wherein the step of activating is accomplished in a repetitive fashion during the take-off and landing of the aircraft.

31. A method as defined in claim 29 wherein the system is an aircraft and wherein the step of activating is accomplished in a repetitive fashion during the take-off, flight and landing of the aircraft.

32. A method as defined in claim 29 wherein the step of activating is accomplished during the initial starting and also during the operation of each of the engines whereby the probability of loss of power from one or more of the engines due to a loss of combustion within the engine is substantially eliminated.

33. A photon ignition system for igniting a hydrocarbon fuel spray within a combustion chamber of a gas turbine engine, the photon ignition system comprising:
    means for generating a source of photons having a wavelength or wavelengths primarily within a range of wavelengths of approximately 185 nm to approximately 400 nm;
    optical fiber means for transmitting the photons from said generating means to the combustion chamber; and
    focussing means optically coupled to an end of said optical fiber means for directing the photons to at least one air/fuel spray emanating from at least one fuel injector within the combustion chamber, the air/fuel spray being comprised of a plurality of hydrocarbon fuel droplets, the fuel droplets having a wavelength absorption characteristic for absorbing the photons such that the droplets are heated to an ignition temperature whereby the air/fuel spray is ignited.

34. A system as defined in claim 33 wherein said means for directing is a terminal portion of said fiber, said terminal portion of said fiber having a radially varying index of refraction being operable for optically focussing the photons within a desired region of the fuel.

35. A system as defined in claim 33 wherein said means for generating comprises a flashlamp operable for generating a pulsed photon output having wavelengths within said predetermined range of wavelengths.

36. A system as defined in claim 33 wherein said means for generating is a laser operable for generating a photon output having a wavelength or wavelengths within said predetermined range of wavelengths.

37. A system as defined in claim 33 wherein said means for generating comprises a laser means operable for generating a photon output having wavelengths within said predetermined range of wavelengths.

* * * * *

UNITED STATES PATENT AND TRADEMARK OFFICE
CERTIFICATE OF CORRECTION

PATENT NO. : 4,947,640

DATED : August 14, 1990

INVENTOR(S) : J. Few et al.

It is certified that error appears in the above-identified patent and that said Letters Patent is hereby corrected as shown below:

Title page:
In item [75] on the first page of the Patent please add the name of the following inventor:

E. Jack Sweet, of Trumbull, Conn.

Signed and Sealed this

Fourteenth Day of January, 1992

Attest:

HARRY F. MANBECK, JR.

*Attesting Officer*      *Commissioner of Patents and Trademarks*